(12) United States Patent
Sugiyama (10) Patent No.: US 11,788,749 B2
(45) Date of Patent: Oct. 17, 2023

(54) MULTI-UNIT AIR CONDITIONING SYSTEM (71) Applicant: Mitsubishi Electric Corporation, Tokyo (JP)

(72) Inventor: Maki Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 379 days.

(21) Appl. No.: 17/289,052

(22) PCT Filed: Jan. 31, 2019

(86) PCT No.: PCT/JP2019/003398
§ 371 (c)(1),
(2) Date: Apr. 27, 2021

(87) PCT Pub. No.: WO2020/157920
PCT Pub. Date: Aug. 6, 2020

(65) Prior Publication Data
US 2021/0404684 A1    Dec. 30, 2021

(51) Int. Cl.
*F24F 11/52* (2018.01)
*F24F 11/32* (2018.01)
*F24F 11/79* (2018.01)
*G05B 19/042* (2006.01)

(52) U.S. Cl.
CPC .............. *F24F 11/32* (2018.01); *F24F 11/52* (2018.01); *F24F 11/79* (2018.01); *G05B 19/042* (2013.01); *G05B 2219/2614* (2013.01)

(58) Field of Classification Search
CPC .. F24F 11/32; F24F 11/52; F24F 11/79; F24F 11/38; G05B 2219/2614
See application file for complete search history.

(56) References Cited

U.S. PATENT DOCUMENTS

2013/0060386 A1\* 3/2013 Cha .......................... F24F 11/61
  700/278
2017/0089605 A1\* 3/2017 Kim ...................... F24F 1/0073

FOREIGN PATENT DOCUMENTS

| JP | 2000-193292 A | 7/2000 |
| JP | 2007-003126 A | 1/2007 |
| JP | 2013-174384 A | 9/2013 |

\* cited by examiner

*Primary Examiner* — Michael W Choi
(74) *Attorney, Agent, or Firm* — POSZ LAW GROUP, PLC

(57) ABSTRACT

A multi-unit air conditioning system includes a plurality of indoor units each of which causes a notification unit of the indoor unit to operate in response to a notification signal from a control device. When at least one indoor unit among the plurality of indoor units is malfunctioning, the at least one indoor unit each transmits a malfunction occurred signal which includes identification information of the indoor unit to the control device. If the control device cannot check operation of the notification unit of each of the malfunctioning at least one indoor unit by a response signal corresponding to the transmitted notification signal, the control device transmits a notification signal to an indoor unit to which a notification signal has not been transmitted among the plurality of indoor units.

8 Claims, 8 Drawing Sheets

MULTI-UNIT AIR CONDITIONING SYSTEM

This application is a U.S. national stage application of PCT/JP2019/003308 filed on Jan. 31, 2019, the contents of which are incorporated herein by reference.

TECHNICAL FIELD

The present invention relates to a multi-unit air conditioning system which includes a plurality of indoor units.

BACKGROUND ART

Conventionally, air conditioners are known which have a function of notifying of malfunctions. For example, Japanese Patent Laying-Open No. 2000-193292 (PTL 1) discloses an air conditioner which manipulates, in the event of malfunction of the air conditioner, the orientation of a flap while blinking an operation indicator lamp. According to such air conditioners, checking of a malfunction is facilitated, and the maintenance to prevent malfunctions can be performed efficiently.

CITATION LIST

Patent Literature

PTL 1: Japanese Patent Laying-Open No. 2000-193292

SUMMARY OF INVENTION

Technical Problem

In a multi-unit air conditioning system which includes multiple indoor units, if each indoor unit includes a configuration of notifying of a malfunction, as with the air conditioner disclosed in PTL 1, a malfunctioning indoor unit can be readily identified in a space in which a plurality of indoor units are disposed. However, if the configuration of notifying of a malfunction is not working due to its failure or the like, it is difficult to distinguish a malfunctioning indoor unit from a normally operating indoor unit, based on the operation of the configuration.

The present invention is made to solve the problem as mentioned above, and an object of the present invention is to provide a multi-unit air conditioning system which facilitates the discovery of a malfunctioning indoor unit.

Solution to Problem

A multi-unit air conditioning system according to the present invention includes an outdoor unit, a plurality of indoor units, and a control device. The outdoor unit is disposed in a first space. The plurality of indoor units and the outdoor unit form a refrigeration cycle. The plurality of indoor units send an air to at least one second space different from the first space. The control device controls the plurality of indoor units. Each indoor unit among the plurality of indoor units includes a notification unit, and causes the notification unit of the indoor unit to operate in response to a notification signal from the control device. Each indoor unit among the plurality of indoor units transmits to the control device a response signal which includes identification information of the indoor unit, and an operational status of the notification unit of the indoor unit. An operation of the notification unit can be checked by a user who is in the at least one second space. When at least one indoor unit included in the plurality of indoor units is malfunctioning, the at least one indoor unit each transmits to the control device a malfunction occurred signal which includes identification information of the indoor unit. When the control device is unable to check the operation of the notification unit included in each of the malfunctioning at least one indoor unit by a response signal corresponding to the transmitted notification signal, the control device transmits a notification signal to an indoor unit to which a notification signal has not been transmitted among the plurality of indoor units.

Advantageous Effects of Invention

According to the present invention, if the operation of a notification unit of each of the at least one malfunctioning indoor unit cannot be checked by a response signal corresponding to a transmitted notification signal, the control device transmits a notification signal to an indoor unit to which a notification signal has not been transmitted among the plurality of indoor units and causes a notification unit of the indoor unit to operate, thereby facilitating the discovery of the malfunctioning indoor unit.

DESCRIPTION OF EMBODIMENTS

Hereinafter, embodiments according to the present invention will be described, with reference to the accompanying drawings. Note that the same reference signs are used to refer to the same or like parts, and the description thereof will in principle not be repeated.

Embodiment 1

Figure 1:
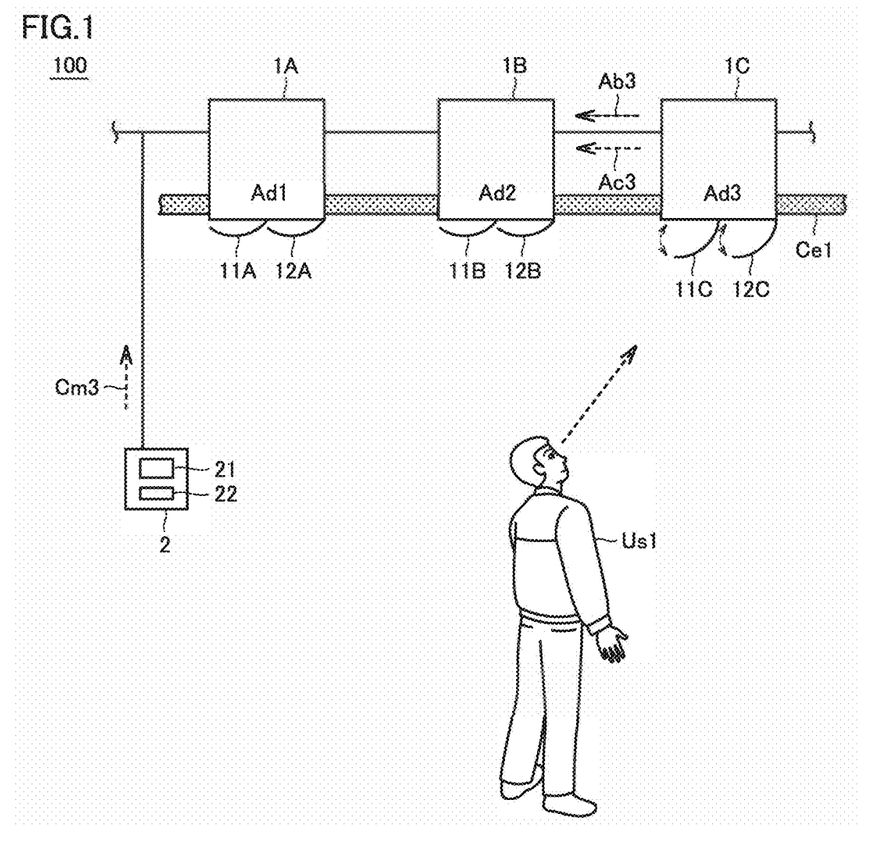
FIG. 1 is a diagram showing an indoor space of a multi-unit air conditioning system according to Embodiment 1.

FIG. 1 is a diagram showing an indoor space of a multi-unit air conditioning system 100 according to Embodiment 1. As shown in FIG. 1, indoor units 1A, 1B, and 1C and a remote controller 2 (a control device) are disposed in an indoor space (a second space). Indoor units 1A to 1C are installed on a ceiling Ce1. Indoor units 1A to 1C and an outdoor unit (not shown in FIG. 1) disposed on an outdoor space (a first space) form a refrigeration cycle, and indoor units 1A to 1C sends an air to the indoor space. Note that indoor units 1A to 1C shown in FIG. 1 are part of multiple indoor units included in multi-unit air conditioning system 100. The indoor units may be disposed in multiple spaces.

On an air outlet of each indoor unit, vanes (wind-direction adjusting plates) are disposed for changing the direction in which the indoor unit blows. The vanes are driven by a motor not shown. The indoor unit 1A includes vanes 11A and 12A. Indoor unit 1B includes vanes 11B and 12B. Indoor unit 1C includes vanes 11C and 12C. The operation of each vane is viewable from the indoor space.

Remote controller 2 is installed on a wall of the indoor space. Remote controller 2 includes a display unit 21 and an operation unit 22. On display unit 21A, a user Us1 can check the room temperature, the operation mode, the air delivery rate of each indoor unit, and the direction in which the indoor unit blows, etc. Using operation unit 22, user Us1 can change the room temperature setting, the operation mode, the air delivery rate of each indoor unit, and the direction in which the indoor unit blows, etc. For example, as user Us1 changes on operation unit 22 the direction in which indoor unit 1A blows, the orientations of vanes 11A and 12A are changed. Note that user Us1 includes, for example, an operator who performs maintenance of multi-unit air conditioning system 100.

The outdoor unit, the indoor units, and remote controller 2 included in multi-unit air conditioning system 100 are connected to a communication network and communicable with another other. The indoor units are each assigned with a unique address (identification information) that is used for communications with remote controller 2. Indoor units 1A, 1B, and 1C are assigned with addresses Ad1, Ad2, and Ad3, respectively.

In the event of malfunction of at least one indoor unit among the indoor units, each malfunctioning indoor unit transmits a malfunction occurred signal which includes the address of the indoor unit and a malfunction code to remote controller 2. FIG. 1 shows a malfunctioning indoor unit 1C transmitting a malfunction occurred signal Ab3, which includes address Ad3 and a malfunction code, to remote controller 2.

In response to the receipt of malfunction occurred signal Ab3, remote controller 2 automatically transmits a notification signal Cm3 to address Ad3 included in malfunction occurred signal Ab3. In response to notification signal Cm3, indoor unit 1C causes vanes 11C and 12C to swing, and transmits a response signal Ac3 which includes address Ad3 and the operational statuses of vanes 11C and 12C to remote controller 2. User Us1 can visually check that vanes 11C and 12C are swinging, thereby distinguishing a malfunctioning indoor unit 1C from normally operating indoor unit 1A whose vanes 11A and 12A are stopped and a normally operating indoor unit 1B whose vanes 11B and 12B are stopped.

When the vanes of all the indoor units are operating normally, a normally operating indoor unit and a malfunctioning indoor unit are distinguishable therebetween by the operations of the vanes. However, if the vanes of a malfunctioning indoor unit are failed and not operating, it is difficult to distinguish between a malfunctioning indoor unit and a normally operating indoor unit by the operation of the vanes. Moreover, if remote controller 2 is unable to receive a response signal corresponding to the transmitted notification signal, which may indicate that a malfunction is occurring between remote controller 2 and a malfunctioning indoor unit and a notification signal from remote controller 2 is not reached the indoor unit, due to which the vanes of the indoor unit are not swinging.

Thus, in multi-unit air conditioning system 100, if remote controller 2 cannot check, by a response signal corresponding to the transmitted notification signal, that the vanes of each malfunctioning indoor unit are swinging, remote controller 2 transmits a notification signal to all the normally operating indoor units. As a result, the vanes of a normally operating indoor unit are swinging while the vanes of a malfunctioning indoor unit are stopped. Thus, user Us1 can identify a malfunctioning indoor unit among the indoor units in the indoor space. Note that the case where remote controller 2 cannot check, by a response signal corresponding to the transmitted notification signal, that the vanes of each malfunctioning indoor unit are swinging includes the case where the response signal contains information indicative of failure of the vanes, and the case where remote controller 2 cannot receive a response signal corresponding to the transmitted notification signal.

Figure 2:
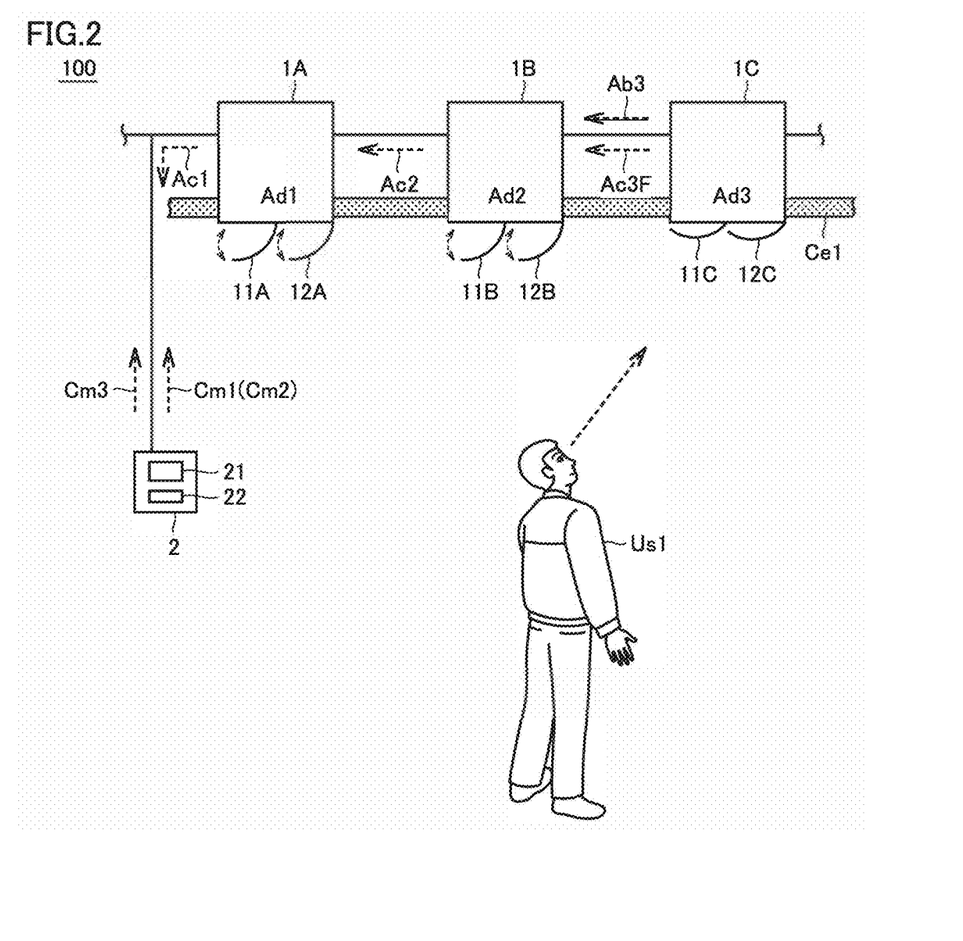
FIG. 2 is a diagram showing the multi-unit air conditioning system of FIG. 1 in which vanes of an indoor unit are failed.

FIG. 2 is a diagram showing multi-unit air conditioning system 100 of FIG. 1 in which vanes 11C and 12C of indoor unit 1C are failed. As shown in FIG. 2, a malfunctioning indoor unit 1C adds information indicative of the failure of the vanes to response signal Ac3F, and transmits response signal Ac3F to remote controller 2. In response to response signal Ac3F, remote controller 2 transmits notification signals Cm1 and Cm2 to normally operating indoor units 1A and 1B, respectively. In response to notification signal Cm1, indoor unit 1A transmits response signal Ac1 to remote controller 2, and causes vanes 11A and 12A to swing. In response to notification signal Cm2, indoor unit 1B transmits response signal Ac2 to remote controller 2, and causes vanes 11B and 12B to swing. User Us1 can visually check that vanes 11C and 12C of malfunctioning indoor unit 1C are stopped, thereby distinguishing malfunctioning indoor unit 1C from a normally operating indoor unit 1A whose vanes 11A and 12A are swinging and indoor unit 1B whose vanes 11B and 12B are swinging.

Figure 3:
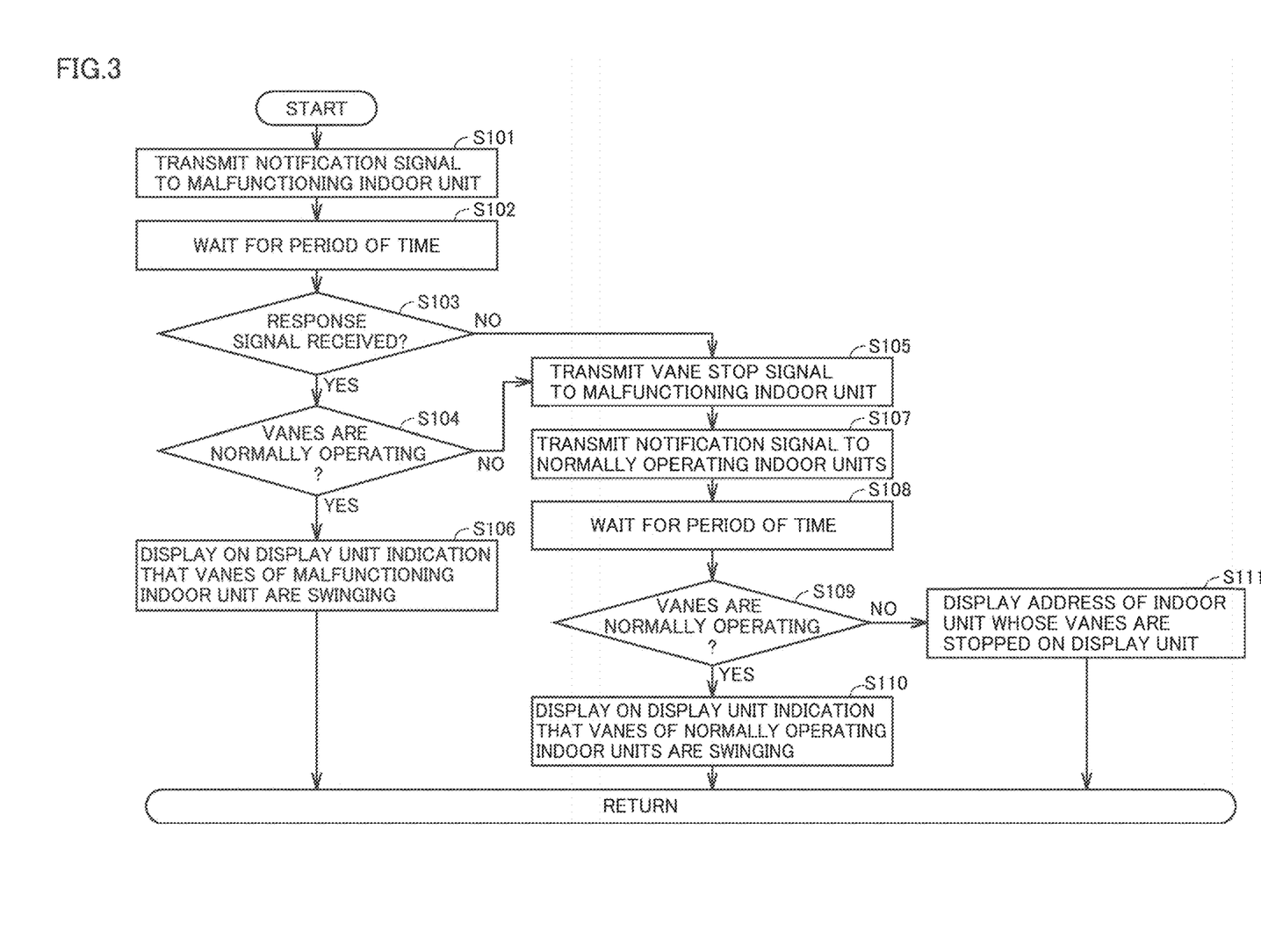
FIG. 3 is a flowchart showing a flow of a process that is performed by remote controller of FIGS. 1 and 2 upon receipt of a malfunction occurred signal from an indoor unit.

FIG. 3 is a flowchart showing a flow of a process that is performed by remote controller 2 of FIGS. 1 and 2 upon receipt of a malfunction occurred signal from an indoor unit. The process illustrated in FIG. 3 is called from the main routine that performs an integrated process for remote controller 2. In the following, the steps will be referred to simply as S.

As shown in FIG. 3, in S101, remote controller 2 transmits a notification signal to an indoor unit that corresponds to the address included in the received malfunction occurred signal, and passes the process to S102. In S102, remote controller 2 waits for a period of time, and then passes the process to S103. Note that if remote controller 2 receives multiple malfunction occurred signals simultaneously, remote controller 2 transmits a notification signal to an indoor unit corresponding to an address in the order starting from the smallest address to the largest address.

In S103, remote controller 2 determines whether remote controller 2 has received a response signal corresponding to the notification signal transmitted in S101. If remote controller 2 has received a response signal (YES in S103), remote controller 2 passes the process to S104. If remote controller 2 does not receive a response signal (NO in S103), remote controller 2 passes the process to S105.

In S104, remote controller 2 determines whether the response signal contains information indicating that the vanes are normally operating. If the response signal contains the information indicating that the vanes are normally operating (YES in S104), remote controller 2, in S106, displays on display unit 21 an indication that the vanes of a malfunctioning indoor unit are swinging, the address of the malfunctioning indoor unit, and a malfunction code, and returns the process to the main routine. If the response signal contains information indicating that the vanes are malfunctioning (NO in S104), remote controller 2 passes the process to S105.

In S105, remote controller 2 transmits a vane stop signal to the malfunctioning indoor unit, and passes the process to S107. In S107, remote controller 2 transmits a notification signal to all the normally operating indoor units, and passes the process to S108. In S108, remote controller 2 waits for a period of time, and then passes the process to S109.

In S109, remote controller 2 determines whether the response signals from the normally operating indoor units each include information indicating that the vanes are normally operating. If the response signal from each normally operating indoor unit includes the information indicating that the vanes are nominally operating (YES in S109), remote controller 2, in S110, displays on display unit 21 an indication that the vanes of the normally operating indoor units are swinging, the address of a malfunctioning indoor unit, and a malfunction code, and returns the process to the main routine.

If the response signals from the normally operating indoor units includes a response signal that contains information indicating that the vanes are malfunctioning (NO in S109), remote controller 2, in S111, displays the address of a normally operating indoor unit whose vanes are stopped and the address of a malfunctioning indoor unit on display unit 21, and returns the process to the main routine.

Figure 4:
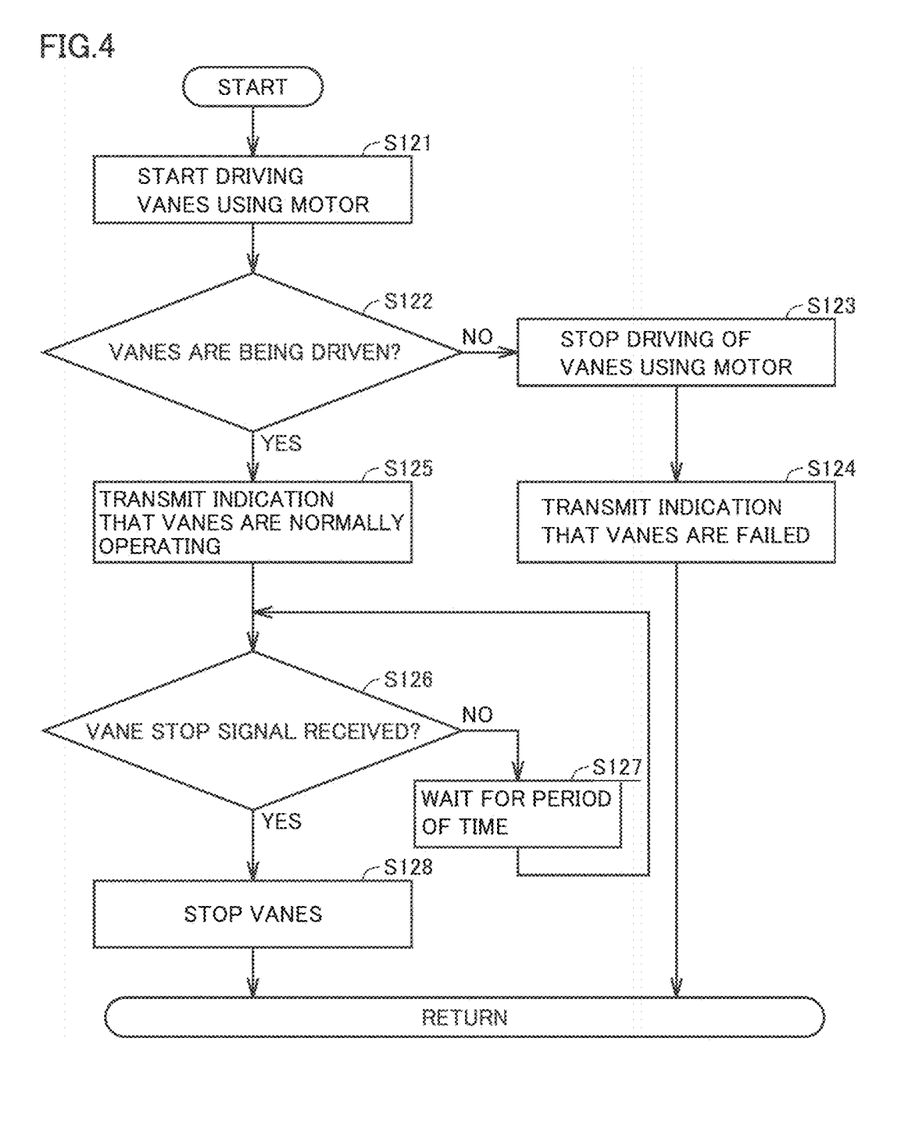
FIG. 4 is a flowchart showing a flow of a process that is performed by an indoor unit included in the multi-unit air conditioning system according to Embodiment 1, upon receipt of a notification signal.

FIG. 4 is a flowchart showing a flow of a process that is performed by an indoor unit included in multi-unit air conditioning system 100 according to Embodiment 1, upon receipt of a notification signal. The process illustrated in FIG. 4 is called from the main routine that performs the integrated process for the indoor unit.

As shown in FIG. 4, in S121, the indoor unit starts driving the vanes, using a motor, and passes the process to S122. In S122, the indoor unit determines whether the vanes are being driven. The indoor unit may use a signal regarding: the rotation of the motor obtained by a sensor to determine in a mechanical or circuitry manner whether the vanes are being driven, or use a video capturing the vanes or the motor obtained by a camera to determine whether the vanes are being driven.

If the vanes are not being driven (NO in S122), the indoor unit, in S123, stops the motor, and passes the process to S124. In S124, the indoor unit adds information indicative of failure of the vanes to a response signal, transmits the response signal to remote controller 2, and returns the process to the main routine.

If the vanes are being driven (YES in S122), the indoor unit, in S125, adds information indicating that the vanes are normally operating to a response signal, transmits the response signal to remote controller 2, and passes the process to S126. In S126, the indoor unit determines whether the indoor unit has received a vane stop signal.

If the indoor unit does not receive a vane stop signal (NO in S126), the indoor unit, in S127, waits for a period of time, and then returns the process to S126. If the indoor unit has received a vane stop signal (YES in S126), the indoor unit, in S128, stops the motor driving the vanes, and returns the process to the main routine.

Referring again to FIG. 3, in response to the receipt of the malfunction occurred signal, remote controller 2 automatically transmits a notification signal to the indoor unit corresponding to the address included in the malfunction occurred signal. Remote controller 2 also transmits a notification signal to the indoor unit that is selected by user Us1 on operation unit 22 of remote controller 2.

Figure 5:
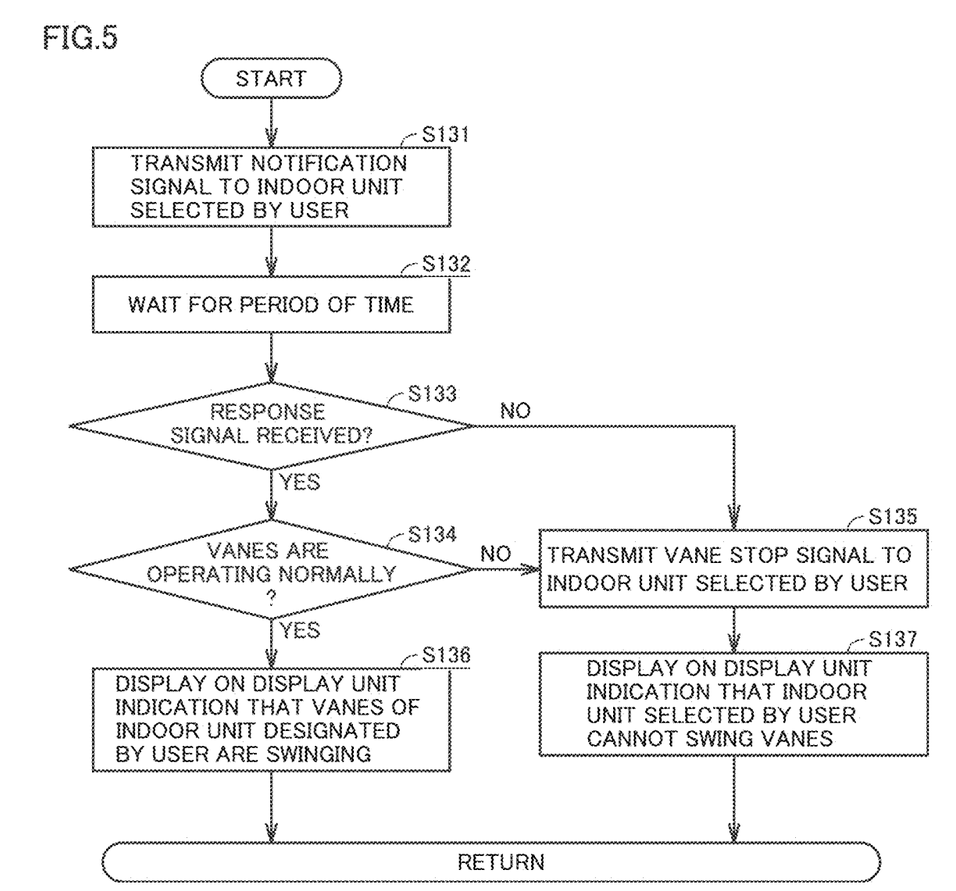
FIG. 5 is a flowchart showing a flow of a process that is performed by the remote controller of FIGS. 1 and 2 when a user selects an indoor unit, using an operation unit.

FIG. 5 is a flowchart showing a flow of a process that is performed by remote controller 2 of FIGS. 1 and 2 when the user has selected an indoor unit on operation unit 22. The process illustrated in FIG. 5 is called from the main routine that performs the integrated process for remote controller 2.

As shown in FIG. 5, in S131, remote controller 2 transmits a notification signal to the indoor unit selected by user Us1, and passes the process to S132. In S132, remote controller 2 waits for a period of time, and then passes the process to S133.

In S133, remote controller 2 determines whether remote controller 2 has received, a response signal corresponding to the notification signal transmitted in S131. If remote controller 2 has received a response signal (YES in S133), remote controller 2 passes the process to S134. If remote controller 2 does not receive a response signal (NO in S133), remote controller 2 passes the process to S135.

In S134, remote controller 2 determines whether the response signal contains information indicating that the vanes are operating normally. If the response signal includes the information indicating that the vanes are operating normally (YES in S134), remote controller 2, in S136, displays on display unit 21 an indication that the vanes of the indoor unit selected by the user are swinging, and the address of the indoor unit, and returns the process to the main routine. If the response signal contains information indicating that the vanes are malfunctioning (NO in S134), remote controller 2 passes the process to S135.

In S135, remote controller 2 transmits a vane stop signal to the indoor unit selected by the user, and passes the process to S137. In S137, remote controller 2 displays on display unit 21 an indication that the indoor unit selected by the user cannot swing the vanes, and the address of the indoor unit, and returns the process to the main routine.

Note that multi-unit air conditioning system 100 has been described with reference to using the vanes as the notification unit. The notification unit may be any configuration, insofar as the operation of the notification unit can be checked by the user who is in the indoor space. For example, the notification unit may include a fan, a light emitting diode (LED), and a loudspeaker. If a fan is used as the notification unit, the user in a room can distinguish between a malfunctioning indoor unit and a normally operating indoor unit, based on an air delivery rate from the fan per unit time. If an LED is used as the notification unit, the user in a room can distinguish between a malfunctioning indoor unit and a normally operating indoor unit, based on a light-emitting mode of the LED. If a loudspeaker is used as the notification unit, the user in a room can distinguish between a malfunctioning indoor unit and a normally operating indoor unit, based on a sound from the loudspeaker or a volume of the loudspeaker.

As described above, according to the multi-unit air conditioning system of Embodiment 1, the discovery of a malfunctioning indoor unit can be facilitated.

Embodiment 2

Embodiment 2 will be described, with reference to the use of a personal computer, instead of the remote controller according to Embodiment 1.

Figure 6:
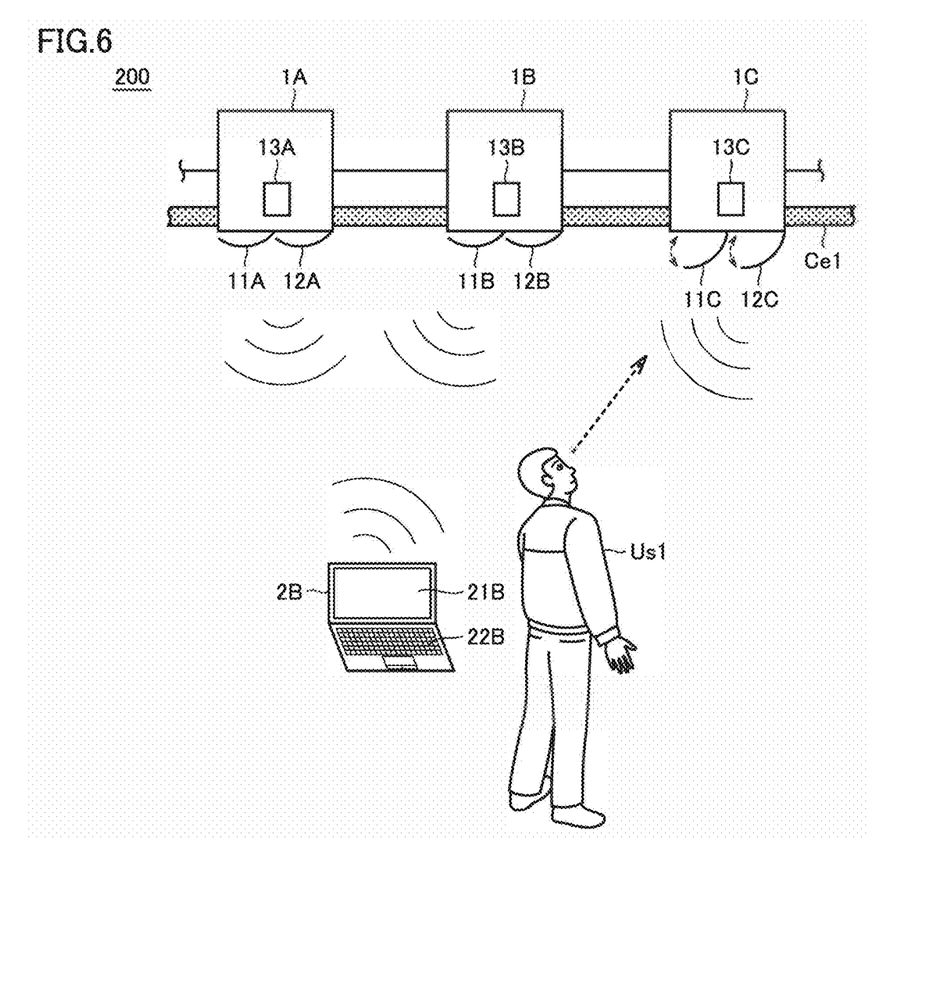
FIG. 6 is a diagram showing an indoor space of a multi-unit air conditioning system according to Embodiment 2.

FIG. 6 is a diagram showing an indoor space of a multi-unit air conditioning system 200 according to Embodiment 2. Multi-unit air conditioning systems 200 and 100 are the same, except that multi-unit air conditioning system 200 includes a personal computer 2B replacing remote controller 2 of FIG. 1, and each indoor unit includes a wireless communications unit. Thus, the description will not be repeated.

As shown in FIG. 6, indoor units 1A, 1B, and 1C include wireless communications units 13A, 13B, and 13C, respectively. Indoor units 1A, 1B, and 1C perform wireless communications with personal computer 2B. Indoor units 1A, 1B, and 1C and personal computer 2B may communicate with each other via wired connection.

Personal computer 2B includes a display 21B (display unit) and an operation unit 22B. Operation unit 22B has a keyboard and a touchpad. An application for controlling multi-unit air conditioning system 200 is pre-installed in personal computer 2B. A user Us1 manipulates the application through input to operation unit 22B on personal computer 2B, thereby controlling multi-unit air conditioning system 200. Personal computer 2B performs the processes illustrated in FIGS. 3 and 5. While personal computer 2B is disposed in an indoor space in FIG. 6, it should be noted that personal computer 2B may be disposed in an outdoor space.

As described above, according to multi-unit air conditioning system of Embodiment 2, the discovery of a malfunctioning indoor unit can be facilitated.

Embodiment 3

Figure 7:
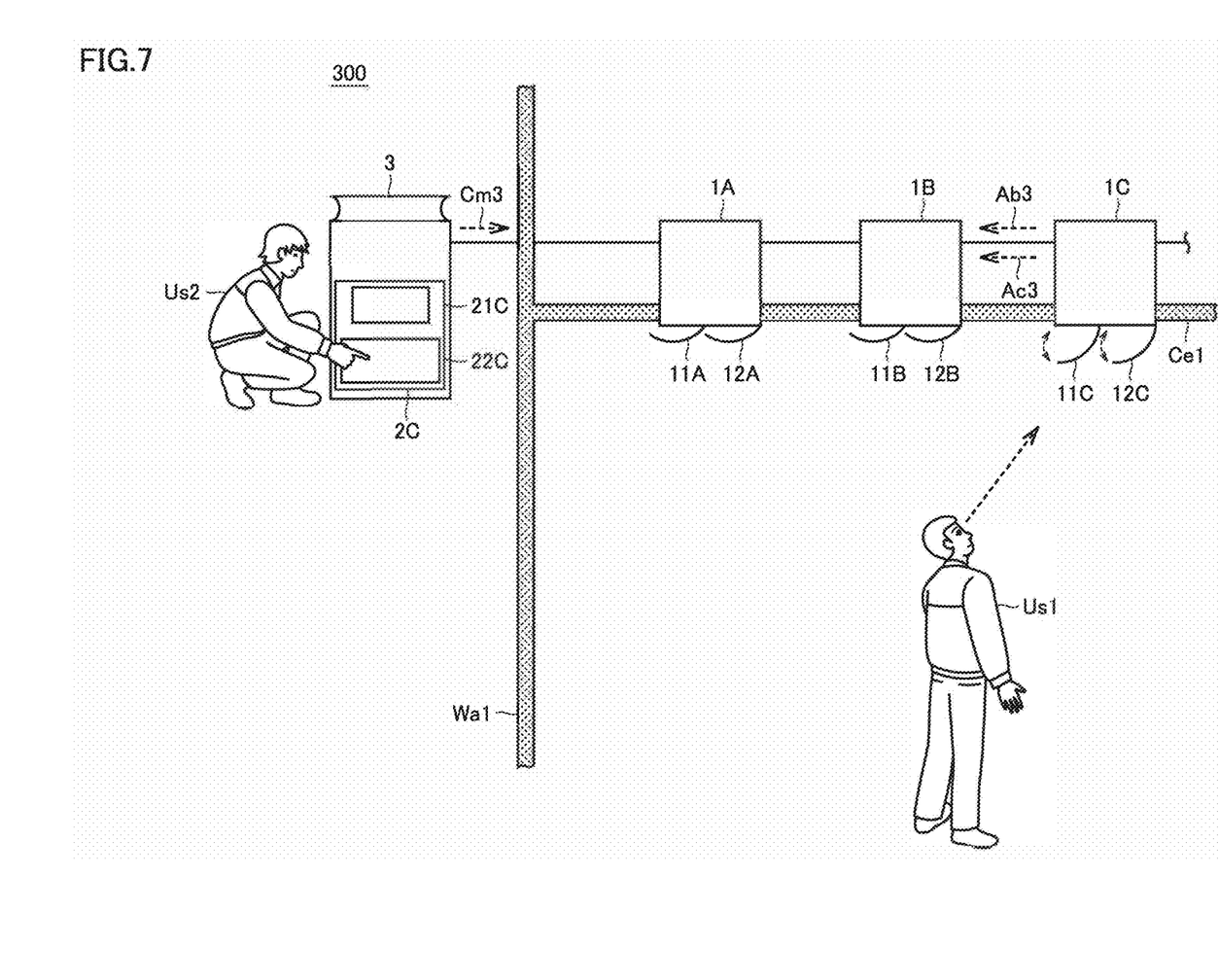
FIG. 7 is a diagram showing a multi-unit air conditioning system according to Embodiment 3.

Embodiment 3 will be described, with reference to a control device being installed in an outdoor unit. FIG. 7 is a diagram showing a multi-unit air conditioning system 300 according to Embodiment 3. Multi-unit air conditioning systems 300 and 100 are the same, except that multi-unit air conditioning systems 300 includes a control device 2C replacing remote controller 2 of FIG. 1. Thus, the description will not be repeated.

As shown in FIG. 7, an outdoor space and an indoor space are separated by a wall Wa1. An outdoor unit 3 is disposed in the outdoor space. Control device 2C is installed in an outdoor unit 3. Control device 2C includes a display 21C (display unit) and an operation unit 22C. Control device 2C performs the processes illustrated in FIGS. 3 and 5.

A user Us2 in the outdoor space selects an indoor unit via operation unit 22C, thereby allowing a user Us1 in the indoor space to check that vanes 11C and 12C of the indoor unit are swinging. FIG. 7 shows user Us2 selecting an indoor unit 1C.

As described above, according to the multi-unit air conditioning system of Embodiment 3, the discovery of a malfunctioning indoor unit can be facilitated.

Embodiment 4

In Embodiment 4, a configuration will be described which further facilitates the discovery of a malfunctioning indoor unit than Embodiment 1 by a malfunctioning indoor unit and a normally operating indoor unit each having a different wireless communication strength, in addition to each having a different notification unit operation.

Figure 8:
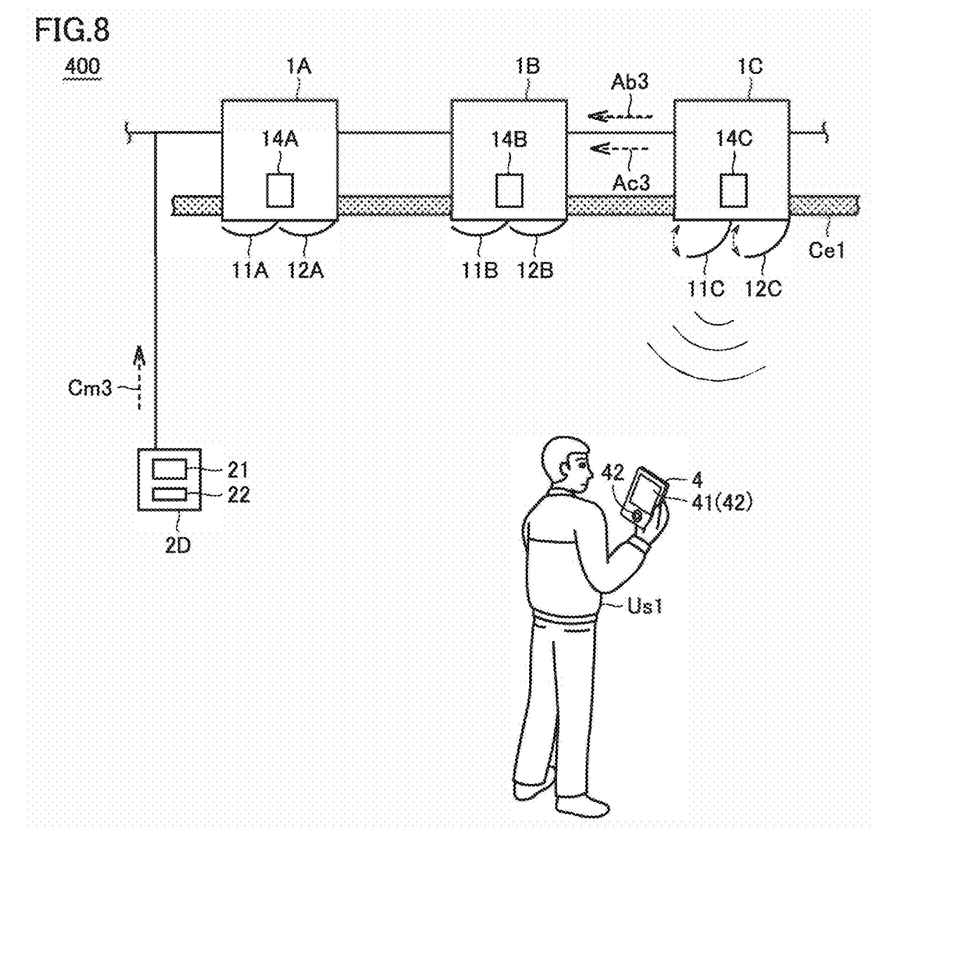
FIG. 8 is a diagram showing an indoor space of a multi-unit air conditioning system according to Embodiment 4.

FIG. 8 is a diagram showing an indoor space of a multi-unit air conditioning system 400 according to Embodiment 4. Multi-unit air conditioning systems 400 and 100 are the same, except that multi-unit air conditioning systems 400 includes remote controller 2D replacing remote controller 2, and indoor units each including a wireless communication unit, and a user Us1 is holding a mobile terminal 4. Thus, the description will not be repeated.

As shown in FIG. 8, indoor units 1A, 1B, and 1C include wireless communications units 14A, 14B, and 14C, respectively. When remote controller 2D transmits a notification signal, remote controller 2D transmits a wireless strength signal to each indoor unit in accordance with the status of the indoor unit so that the strength of a wireless radio (wireless strength) of a malfunctioning indoor unit and the wireless strength of a normally operating indoor unit are different. In response to the wireless strength signal from remote controller 2, the wireless communications unit of each of the multiple indoor units changes the strength for wireless communications. For example, if indoor unit 1C is malfunctioning, remote controller 2D transmits to indoor unit 1C a wireless strength signal corresponding to a maximum wireless strength, and transmits to indoor units 1A and 1B wireless strength signals corresponding to respective minimum wireless strengths. Remote controller 2D may transmits to indoor unit 1C a wireless strength signal corresponding to a minimum wireless strength of indoor unit 1C, and transmits to indoor units 1A to and 1B wireless strength signals corresponding to maximum wireless strengths of indoor units 1A and 1B, respectively. A notification signal and a wireless strength signal may be separate signals, or a wireless strength may be added to a notification signal.

Mobile terminal 4 is, for example, smartphone. Mobile terminal 4 includes a display 41 and an operation unit 42. Operation unit 42 has buttons and a touch panel. Mobile terminal 4 displays on the display 41 the strength of a wireless radio emitted from a device that is capable of wireless communications. User Us1 can check whether a malfunctioning indoor unit is in proximity, while checking the wireless strength displayed on the display 41 of mobile terminal 4.

As described above, according to the multi-unit air conditioning system of Embodiment 4, the discovery of a malfunctioning indoor unit can be further facilitated than Embodiment 1 by allowing the user to check the wireless communication strength.

The presently disclosed embodiments are also expected to be combined and implemented as appropriate within a consistent range. The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST 1A, 1B, 1C indoor unit; 2, 2D remote controller; 2B personal computer; 2C control device; 3 outdoor unit; 4 mobile terminal; 11A to 11C, 12A to 12C vanes; 13A to 13C, 14A to 14C wireless communications unit; 21 display unit; 21B, 21C, 41 display; 22, 22B, 22C, 42 operation unit; 100, 200, 300, 400 multi-unit air conditioning system; Ce1 ceiling; and Wa1 wall.

The invention claimed is:

1. A multi-unit air conditioning system, comprising:
an outdoor unit disposed in a first space;
a plurality of indoor units to send an air to at least one second space different from the first space, the plurality of indoor units and the outdoor unit forming a refrigeration cycle; and a control device to control the plurality of indoor units, wherein each indoor unit among the plurality of indoor units includes a notification unit, and causes the notification unit of the indoor unit to operate in response to a notification signal from the control device, and transmits to the control device a response signal which includes identification information of the indoor unit, and an operational status of the notification unit of the indoor unit, an operation of the notification unit can be checked by a user who is in the at least one second space, when at least one indoor unit included in the plurality of indoor units is malfunctioning, the at least one indoor unit each transmits to the control device a malfunction occurred signal which includes identification information of the indoor unit, and when the control device cannot check the operation of the notification unit included in each of the at least one indoor unit by a response signal corresponding to the transmitted notification signal, the control device transmits a notification signal to an indoor unit to which a notification signal has not been transmitted among the plurality of indoor units.

2. The multi-unit air conditioning system according to claim 1, wherein the control device is disposed in any one of the at least one second space, and, in response to receipt of a malfunction occurred signal, automatically transmits a notification signal to an indoor unit corresponding to identification information included in the malfunction occurred signal.

3. The multi-unit air conditioning system according to claim 1, wherein the control device includes an operation unit which allows the user to select an indoor unit from among the plurality of indoor units, and transmits a notification signal to the indoor unit selected by the user on the operation unit.

4. The multi-unit air conditioning system according to claim 3, wherein the control device is disposed in the first space.

5. The multi-unit air conditioning system according to claim 1, wherein the control device includes a display unit, and the control device displays on the display unit whether each notification unit included in the at least one indoor unit is operating or whether the notification unit of a normally operating indoor unit among the plurality of indoor units is operating.

6. The multi-unit air conditioning system according to claim 1, wherein the control device is a personal computer in which an application for controlling the plurality of indoor units is installed, and transmits a notification signal to an indoor unit selected from among the plurality of indoor units by a user input to the application.

7. The multi-unit air conditioning system according to claim 1, wherein the plurality of indoor units each further include a wireless communications unit, when the control device transmits the notification signal, the control device transmits to each indoor unit among the plurality of indoor units a wireless strength signal responsive to a status of the indoor unit so that a malfunctioning indoor unit and a normally operating indoor unit have different wireless strengths, and the wireless communications unit changes a strength for wireless communications in response to the wireless strength signal from the control device.

8. The multi-unit air conditioning system according to claim 1, wherein as the notification unit, the plurality of indoor units each include a wind-direction adjusting plate which changes a direction in which the indoor unit blows, and cause the wind-direction adjusting plate to swing in response to the notification signal from the control device.

* * * * *